2,949,489

PREPARATION OF SOBREROL

Antony J. Durbetaki, Buffalo, and Seymour M. Linder, Eggertsville, N.Y., assignors to Food Machinery and Chemical Corporation, San Jose, Calif.

No Drawing. Filed June 23, 1958, Ser. No. 744,015

3 Claims. (Cl. 260—631.5)

This invention relates to the preparation of sobrerol, and particularly to the preparation of sobrerol from $\alpha$-pinene oxide in high yields.

$\alpha$-Pinene is a terpene which is present as a chief constituent in turpentine oil, and accordingly is available in large quantities commercially. $\alpha$-Pinene oxide can be produced from this raw material readily by known epoxidation methods, for example by reaction of the $\alpha$-pinene with perbenzoic acid or a lower aliphatic peracid, such as peracetic acid.

It has been known heretofore that sobrerol is a valuable intermediate in the preparation of carvone, carveol, and dihydrocarveol, and the esters of these materials. These materials, which are useful as flavoring and perfuming agents, can be produced by the action of dilute aqueous mineral acids on $\alpha$-pinene oxide. However, as is recited in U.S. Patent No. 2,803,659 to A. B. Booth et al., the action of dilute acids on $\alpha$-pinene oxide was known to produce not only sobrerol, but also such other products as pinol and $\alpha$-campholene aldehyde. This production of sobrerol only as one of a series of reaction products when $\alpha$-pinene oxide was reacted with dilute acids was recited generally in the literature, for example see Simonsen who reported in "The Terpenes," Simonsen, volume II, 1949, page 141, that this reaction resulted in the preparation of sobrerol, pinol, and campholenic aldehyde.

Accordingly, the production of sobrerol from $\alpha$-pinene oxide by reaction thereof with dilute mineral acids has not been efficient, with low yields of sobrerol being obtained from this reaction. It therefore has been desired to provide an efficient process for converting readily available $\alpha$-pinene oxide to sobrerol.

It is a feature of the present invention to provide an economical process for producing sobrerol from $\alpha$-pinene oxide, in accordance with which essentially quantitative yields of sobrerol can be obtained.

It is a further feature of this invention to provide such a process which can be operated in common equipment and at ambient temperature and pressure, in a short time.

In accordance with the method of this invention, $\alpha$-pinene oxide is dispersed in and caused to react with water which contains, as a catalyst for this reaction, dissolved carbon dioxide. The carbon dioxide, which is employed in the reaction mixture in an amount ranging from a trace up to a saturating amount, may be introduced conveniently in its solid form, that is as "Dry Ice," or as a gas.

After several minutes contact between the aqueous carbon dioxide solution and the $\alpha$-pinene oxide which is dispersed therein, sobrerol commences to precipitate out from the dispersion as white crystals. The reaction to form sobrerol is complete after about 5 minutes to 1 hour, as evidenced by no further formation of crystals. The sobrerol product is then separated from the reaction mixture and dried to provide a white, crystalline, pure product.

The present reaction is conducted in an aqueous medium, with about 1 to 50 parts by weight of $\alpha$-pinene oxide being dispersed in 100 parts by weight of water. The carbon dioxide employed as a catalyst for the conversion of the $\alpha$-pinene oxide to sobrerol can be introduced in the form of carbon dioxide gas, or in its solid form, commonly known as "Dry Ice." The carbon dioxide is employed in solution in the aqueous phase in an amount ranging from a trace to a saturating amount. In this connection, water containing on the order of 0.1 to 0.2 g. of carbon dioxide per 100 g. of water is saturated at the herein temperatures.

It is preferred to employ as a reagent water which is substantially saturated with carbon dioxide, as the conversion of $\alpha$-pinene oxide to sobrerol is effected most rapidly and efficiently with such saturated water solutions. Yields of essentially 100% are obtained in as little as 5 minutes with carbon dioxide-saturated water, whereas when only trace amounts of carbon dioxide are employed, yields of only about 70% are obtained, and the reaction takes as much as 1 hour to run to completion.

A suitable relative determination of the amount of carbon dioxide in solution in distilled water can be made readily by measurement of the pH of such a solution with a Beckman pH meter employing a glass calomel electrode. Freshly distilled water has a pH of 7.0, whereas when the water is saturated with carbon dioxide, its pH is about 3.8, and freshly distilled water containing a trace of carbon dioxide has a pH of about 6.5 to 6.9. At intermediate concentrations of carbon dioxide, the pH of the aqueous solution will vary proportionately.

It is interesting that practice according to the preferred embodiment of the present invention, namely employing water which has been saturated with carbon dioxide, provides yields of essentially 100% sobrerol. This is quite surprising in view of the fact that prior art methods of converting $\alpha$-pinene oxide to sobrerol have resulted at best in yields of about 50%.

The temperature of the reaction mixture during the conversion reaction suitably is about 0° to 35° C. It is necessary with respect to the lower temperature limit only that the aqueous carbon dioxide solution not be frozen. In the case of the upper limit, however, it has been observed that deleterious side reactions occur above about 35° C.

It has been observed that a minor amount of exothermal heat of reaction is generated during the reaction. The small amount of heat which is produced normally does not cause the reaction temperature to rise above 35° C., however in large reaction batches it may be necessary to cool the system in order to maintain the temperature below the desired upper temperature limit of 35° C. In any event, control of the reaction provides no substantial difficulty.

The reason for the unusual advantage of carbon dioxide in the instant reaction has not been positively established. However, the following represents a mechanism which is considered a reasonable explanation of this advantage. In usual acid-catalyzed rearrangements of $\alpha$-pinene oxide, the following steps may be visualized to explain the concomitant formation of campholenic aldehyde with sobrerol.

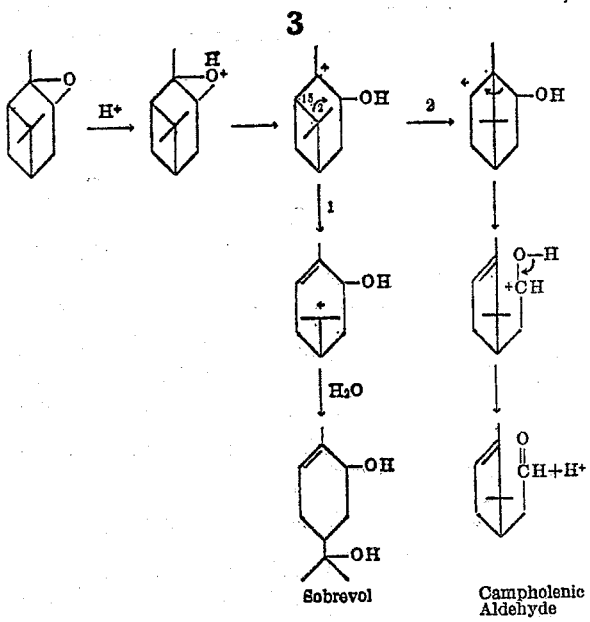

On the other hand in aqueous carbon dioxide solutions the carbon dioxide (which may exist in polarized form:

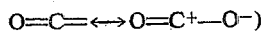

is considered to attack the epoxy oxygen, rather than a hydrogen ion:

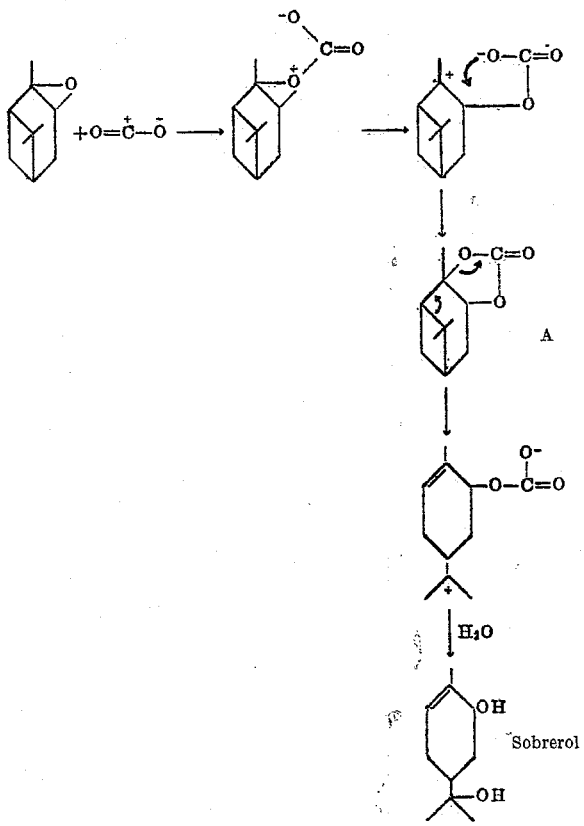

The steric requirement of the carbonate intermediate, A, would discourage the bridged carbon from approaching closer as in sequence 2, and would favor the rearrangement to the sobrerol precursor as shown above. Regardless of the correctness of this mechanism, however, the excellent yields obtained with this process are in fact considerably superior to those obtained with prior art processes, and are obtained uniquely with aqueous carbon dioxide.

The following examples are given only by way of illustration of the present invention, and are not to be deemed limitative thereof.

EXAMPLE 1

Two grams of Dry Ice was placed in a 250-ml. Erlenmeyer flask containing 100 ml. of freshly distilled water, to provide a saturated carbon dioxide solution having a pH of about 3.9 and a temperature of about 16° C. Immediately thereafter 20 g. of α-pinene oxide was added to the solution. The flask then was shaken for 5 minutes, during which time the temperature rose from 16° C. to 25° C. At the end of the 5 minutes of shaking, white crystals of sobrerol had precipitated leaving a clear, single phase liquid.

The white crystalline product was collected by filtration and dried at 120° C. in an oven. The yield of sobrerol was 22.5 g., a quantitative conversion. The product was analyzed by the infrared technique, and provided a spectrum which was superimposable on the spectrum of a sample of sobrerol produced by the method of Pope, Annalen, 6, 315 (1832). It was analyzed further by chemical methods with the results shown in Table 1 which follows.

EXAMPLE 2

Carbon dioxide gas was bubbled for 25 seconds into 100 ml. of freshly distilled water in a 250-ml. Erlenmeyer flask. This provided a carbon dioxide-water solution having a pH of about 5.0, indicating that about one-half of the saturating amount of carbon dioxide was dissolved in the water. The solution was cooled to 5° C. Ten grams of α-pinene oxide then was added and the flask shaken for ten minutes.

At the end of the 10 minutes of shaking the temperature had risen to 15° C. and a white product had precipitated. Although in this case the liquid phase remained somewhat cloudy, no further precipitation occurred upon further shaking. The white, crystalline product was somewhat tacky, perhaps due to the presence of unreacted α-pinene oxide. The product was removed by filtration from the Erlenmeyer flask and dried in an oven at 120° C. Ten grams (90% yield) of sobrerol was collected. It was analyzed by the infrared technique with the results reported for the product of Example 1, and further as described in Table 1 which follows.

EXAMPLE 3

A dilute mixture of carbon dioxide in air was bubbled into 100 ml. of freshly distilled water maintained under nitrogen in a 250 ml. Erlenmeyer flask. The aqueous carbon dioxide solution which was produced had a pH of about 6.7, indicating that a trace of carbon dioxide was dissolved in the water. Fifty grams of α-pinene oxide then was added and the flask was shaken for 30 minutes, during which time the reaction mixture was maintained at about 35° C. At the end of the reaction period of 30 minutes a white crystalline product had precipitated. This product, which similarly to that produced in Example 2 was somewhat tacky, was collected by filtration, and dried at 120° C. in an oven. Thirty-nine grams (70% yield) of sobrerol was collected. It was analyzed by the infrared technique with the results reported for the product of Example 1, and further as described in Table 1 which follows.

EXAMPLE 4

One hundred grams of freshly distilled water was introduced into each of two 250 ml. Erlenmeyer flasks. Thirty grams of α-pinene oxide was added to one of the flasks, and the flask was shaken to disperse the α-pinene oxide in the water in the flask. One gram of Dry Ice then was added to each of the flasks, and the flasks were shaken for several minutes until all of the Dry Ice had converted to a gas, and excess gas had escaped. The water which contained no α-pinene oxide was then tested for pH with a Beckman pH meter, and found to have a pH of 4.1.

The flask containing the α-pinene oxide-water solution was then shaken for 5 minutes, during which time the temperature rose from 16° C. to 23° C. At the end of the 5 minutes of shaking, white crystals of sobrerol had precipitated leaving a clear, single phase liquid.

The white crystalline product was collected by filtration and dried in an oven at 120° C. The yield of sobrerol was 33 g., a quantitative conversion. This product was identified as sobrerol by infrared analysis as described in Example 1, and further as described in Table 1.

EXAMPLE 5

This example is presented to demonstrate the results obtained when α-pinene oxide is reacted with an aqueous sulfuric acid solution having a pH of about 3.9, the preferred pH according to the present process employing carbon dioxide.

Sulfuric acid was added to 100 g. of freshly distilled water in a 250 ml. Erlenmeyer flask to provide in the water a pH of 3.9, and the resulting aqueous solution brought to a temperature of 20° C. Thirty grams of α-pinene oxide then was added, and the flask was shaken for ½ hour, at the end of which time a white crystalline product had precipitated, leaving a cloudy residual liquid.

The white crystalline product was collected by filtration and dried at 120° C. in an oven. The yield was 16 g. of sobrerol, a less than 50% conversion. The residual reaction liquor gave positive results when analyzed qualitatively for epoxy oxygen and aldehydes by the methods identified in footnotes 3 and 4 to Table 1 which follows. The white crystalline product was identified as sobrerol by infrared analysis as described in Example 1, and further as described in Table 1.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Method of preparing sobrerol from α-pinene oxide, consisting of reacting α-pinene oxide with an aqueous solution of carbon dioxide at about 0° C. to 35° C. whereby said α-pinene oxide is converted to sobrerol.

2. Method of preparing sobrerol from α-pinene oxide, consisting of reacting α-pinene oxide with an aqueous solution of carbon dioxide at about 0° C. to 35° C., said α-pinene oxide being dispersed in said aqueous solution in the amount of about 1 to 50 parts of α-pinene oxide by weight for each 100 parts by weight of said aqueous solution, whereby said α-pinene oxide is converted to sobrerol.

3. Method of preparing sobrerol in essentially quantitative amounts from α-pinene oxide, consisting of reacting α-pinene oxide with an aqueous carbon dioxide at about 0° C. to 35° C. solution substantially saturated with carbon dioxide at about 0° C. to 35° C., said α-pinene oxide being dispersed in said aqueous solution in the amount of about 1 to 50 parts of α-pinene oxide by weight for each 100 parts by weight of said aqueous solution, whereby said α-pinene oxide is converted to sobrerol.

References Cited in the file of this patent

Berichte, vol. 42 (1909), pages 4811–15 (page 4814 relied on).

Prilezhaev et al.: Chem. Ab., vol. 24 (1930), page 607.

Table 1

| Product | Percent Secondary OH [1] | | Percent Total OH [2] | | Epoxy [3] | Aldehyde [4] |
|---|---|---|---|---|---|---|
| | Theory | Found | Theory | Found | | |
| Ex. 1 | 9.98 | 9.96 | 19.98 | 19.94 | not detectable | not detectable. |
| Ex. 2 | 9.98 | 10.03 | 19.98 | 19.95 | ----do-------- | Do. |
| Ex. 3 | 9.98 | 9.97 | 19.98 | 20.21 | ----do-------- | Do. |
| Ex. 4 | 9.98 | 9.99 | 19.98 | 19.97 | ----do-------- | Do. |
| Ex. 5 | 9.98 | 9.95 | 19.98 | 19.93 | Residual reaction liquor, positive. | Residual reaction liquor, positive. |

[1] Acetic anhydride method for determining secondary OH, see Ogg, Porter and Willits, "Organic Analysis," vol. I, p. 126.
[2] "Application of Lithium Aluminum Hydride to the Determination of Hydroxyl Groups," Stenmark and Weiss, Anal. Chem., 28, 1784 (1956).
[3] Qualitative Test for Epoxy Oxygen. Davidson and Perlman, "A Guide to Qualitative Organic Analysis."
[4] Qualitative Test for Aldehydes. "Qualitative Organic Microanalysis," Schneider, p. 130.

UNITED STATES PATENT OFFICE
CERTIFICATION OF CORRECTION

Patent No. 2,949,489                      August 16, 1960

Antony J. Durbetaki et al.

It is hereby certified that error appears in the above numbered patent requiring correction and that the said Letters Patent should read as corrected below.

Column 2, line 39, after "100%" insert -- of --; column 3, lines 1 to 5, the third formula in the first line of formulas should appear as shown below instead of as in the patent:

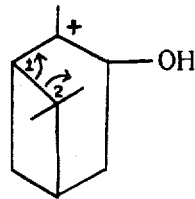

same column 3, line 23, underneath the first formula in the third line of formulas, for "Sobrevol" read -- Sobrerol --; column 4, lines 15, 41, and 59, column 5, lines 7 and 27, for "120°C.", each occurrence, read -- 120°F. --; column 6, lines 26 and 27, strike out "at about 0°C. to 35°C." .

Signed and sealed this 18th day of April 1961.

(SEAL)
Attest:

ERNEST W. SWIDER                      DAVID L. LADD

Attesting Officer                      Commissioner of Patents